UNITED STATES PATENT OFFICE.

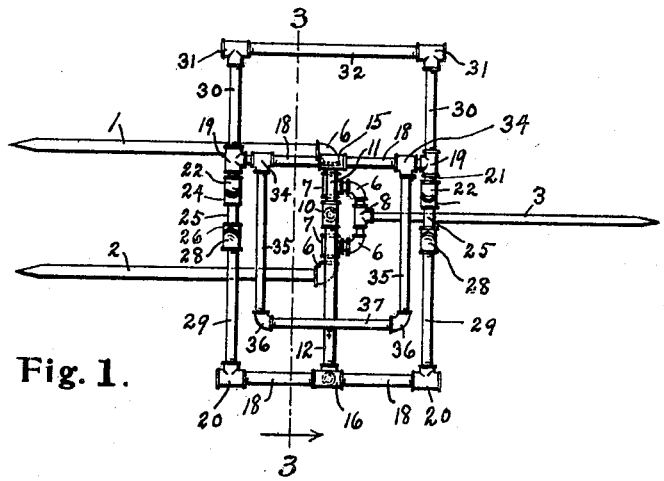

HERBERT F. BEES AND JAY B. WOLCOTT, OF FLINT, MICHIGAN.

HOSE-NOZZLE SUPPORT.

No. 916,978.  Specification of Letters Patent.  Patented April 6, 1909.

Application filed October 14, 1908. Serial No. 457,608.

*To all whom it may concern:*

Be it known that we, HERBERT F. BEES and JAY B. WOLCOTT, citizens of the United States, residing at Flint, in the county of Genesee and State of Michigan, have invented a new and useful Hose-Nozzle Support, of which the following is a specification.

Our invention relates to means for securely holding the nozzle of a fire hose, and the object of these improvements is to provide a support which shall be fully adjustable, of great strength for its weight, and which can be constructed at low cost.

Our invention consists in the combination of a tripod, and a frame swiveled thereon, the frame being formed with depressed portions to receive the nozzle and with a locking device to hold the nozzle in position.

In the accompanying drawing, Figure 1 is a plan of this improved nozzle holder. Fig. 2 is a side elevation of the same. Fig. 3 is a cross section on the line 3—3 of Fig. 1.

Similar reference characters refer to like parts throughout the several views.

The drawings show a hose nozzle holder, embodying our invention, formed of pipe and the ordinary pipe fittings to be found in the market. Our object in illustrating our invention in this manner is to emphasize the ease in which the device may be constructed and not to limit ourselves, as the tubes may be joined in any other desired manner or may be bent where fittings are now employed to form corners.

The frame of the support is mounted on three legs 1, 2, and 3, the legs 1 and 2 being connected by elbows 6 and short tubes 4 that screw into a cross 5. On these tubes are loosely mounted the T's 7 which connect to elbows 6 and these elbows in turn are connected to the T 8 by short nipples. The leg 3 screws into the T 8.

Pivotally mounted in the cross 5 is a stem 9 which screws into the T 10. Tubes 11 and 12 screw into this T and into the elbows 13 and 14 respectively. The T's 15 and 16 connect to the elbows 13 and 14 respectively by short nipples 17. Cross pieces 18 connect the T's 15 and 16 to the T's 19 and 20. The connections between the T's 19 and 20 on each side are formed by the nipples 21, elbows 22, nipples 23, elbows 24, nipples 25, elbows 26, nipples 27, elbows 28 and pipes
29. The T's 19 are connected by the tubes 30, T's 31 and tube 32. The elbows 20 and 31 are preferably equidistant from the nipples 25.

The hose nozzle is laid across the frame in the depressions formed by the elbows 22, 24, 26 and 28 and the nipples between them, as indicated by the dotted circle A in Fig. 3. To hold the nozzle in this position an auxiliary frame is formed by the T's 34, journaled on the cross pipe 18, the side bars 35, the elbows 36 and the cross bar 37, which frame is provided with any desirable means to hold it down, such as the hook 38 that engages the eyes 39 mounted on the pipe 12.

The sizes of the different parts will depend upon the load to be carried. The length of the nipples 17, 23 and 27 will be determined by the diameter of the hose nozzle, although the parts 35 may be bent to permit a nozzle of different size to be secured. The angle between the legs and between them and the ground will determine the inclination of the frame. The frame being secured to the stem 9 turns with it, being therefore pivoted in the cross 5.

Handles may be inserted in the openings of the elbows 20 and 31 if desired although under normal conditions the frame may be swung by grasping the parts 18 and 32. The proportions shown have been found satisfactory but they, together with the details, may be varied as found desirable without departing from the spirit of our invention.

Having now explained our improvements, what we claim as our invention and desire to secure by Letters Patent is:—

1. In a hose nozzle support, the combination of a socket, legs upon which the same is mounted, a stem mounted in the socket, a frame-work of connected bars carried by the stem, and an auxiliary frame hinged to said frame-work for securing the nozzle in position.

2. In a hose nozzle support, the combination of a socket, a cross bar extending from each side of the same, a leg connected to the outer end of each cross bar, a third leg, a connection on the upper end of said third leg engaging the cross bars at each side of the socket, a stem mounted in the socket, a rectangular frame mounted on the stem, and means for securing a hose nozzle to said frame.

3. In a hose nozzle support, the combination of a tripod, a stem revolubly mounted thereon, a cross bar mounted on said stem, a frame, comprising side and end bars, connected to the ends of the cross bar, the said side bars being formed with depressed portions to receive a hose nozzle.

4. In a hose nozzle support, the combination of a tripod, a stem revolubly mounted thereon, a cross bar mounted on said stem, a rectangular frame comprising side bars, end bars, and a transverse bar parallel to the end bars, said side bars being formed with depressions to receive a hose nozzle, a U-shaped auxiliary frame mounted on the transverse bar, and means to secure the auxiliary frame down onto the hose nozzle to hold it in position.

In testimony whereof, we have signed this specification in the presence of two subscribing witnesses.

HERBERT F. BEES.
JAY B. WOLCOTT.

Witnesses:
HOMER A. DAY,
THOMAS H. CHANDLER.